United States Patent
Scarpa

Patent Number: 5,388,127
Date of Patent: Feb. 7, 1995

[54] DIGITAL TIMING RECOVERY CIRCUIT

[75] Inventor: Carl G. Scarpa, Edison, N.J.

[73] Assignee: Hitachi America, Ltd., Tarrytown, N.Y.

[21] Appl. No.: 15,490

[22] Filed: Feb. 9, 1993

[51] Int. Cl.6 .............................................. H03D 3/24
[52] U.S. Cl. ...................................... 375/120; 375/81
[58] Field of Search ................. 375/118, 119, 120, 81, 375/39; 307/269; 328/63; 329/307; 455/260

[56] References Cited

U.S. PATENT DOCUMENTS

| | | | |
|---|---|---|---|
| 4,015,083 | 3/1977 | Bellisio | 375/120 |
| 4,280,099 | 7/1981 | Rattlingourd | 375/119 |
| 4,672,447 | 6/1987 | Möring et al. | 375/120 |

Primary Examiner—Stephen Chin
Assistant Examiner—T. Ghebretinsae
Attorney, Agent, or Firm—Kenyon & Kenyon

[57] ABSTRACT

An implementation efficient digital timing recovery circuit capable of being implemented without the use of multipliers. The circuit includes a voltage controlled crystal oscillator ("VCXO"), a signal generator, a non-linear operation circuit, a digital bandpass filter, a bi-quadratic filter, a digital phase lock loop circuit (DPLL) and a zero crossing detector circuit. The circuit implements a spectral line extraction technique for symbol timing recovery. A signal is received by a tuner, passed through an analog to digital converter, whose sampling rate is controlled by the timing recovery circuit, and is then supplied to a Nyquist filter. The In-phase and quadrature-phase signals output by the Nyquist filter are passed through the non-linear operation circuit to produce a signal which is then passed through the bandpass filter and then the bi-quadratic filter which has a passband centered at the symbol rate of the received signal. A quadrature output signal of the bi-quadratic filter is cross-correlated with an internal signal, generated by the signal generator as a function of the sampling rate, to produce a frequency error signal. The DPLL circuit receives the frequency error signal and uses it to generate a control signal to control the sampling rate of the A/D converter. The DPLL circuit adjusts the sampling rate until the bi-quadratic filter's output is phase locked to the output signal of the internal signal generator. A symbol decision clock signal is generated by the zero crossing detector from the signal generator.

15 Claims, 5 Drawing Sheets

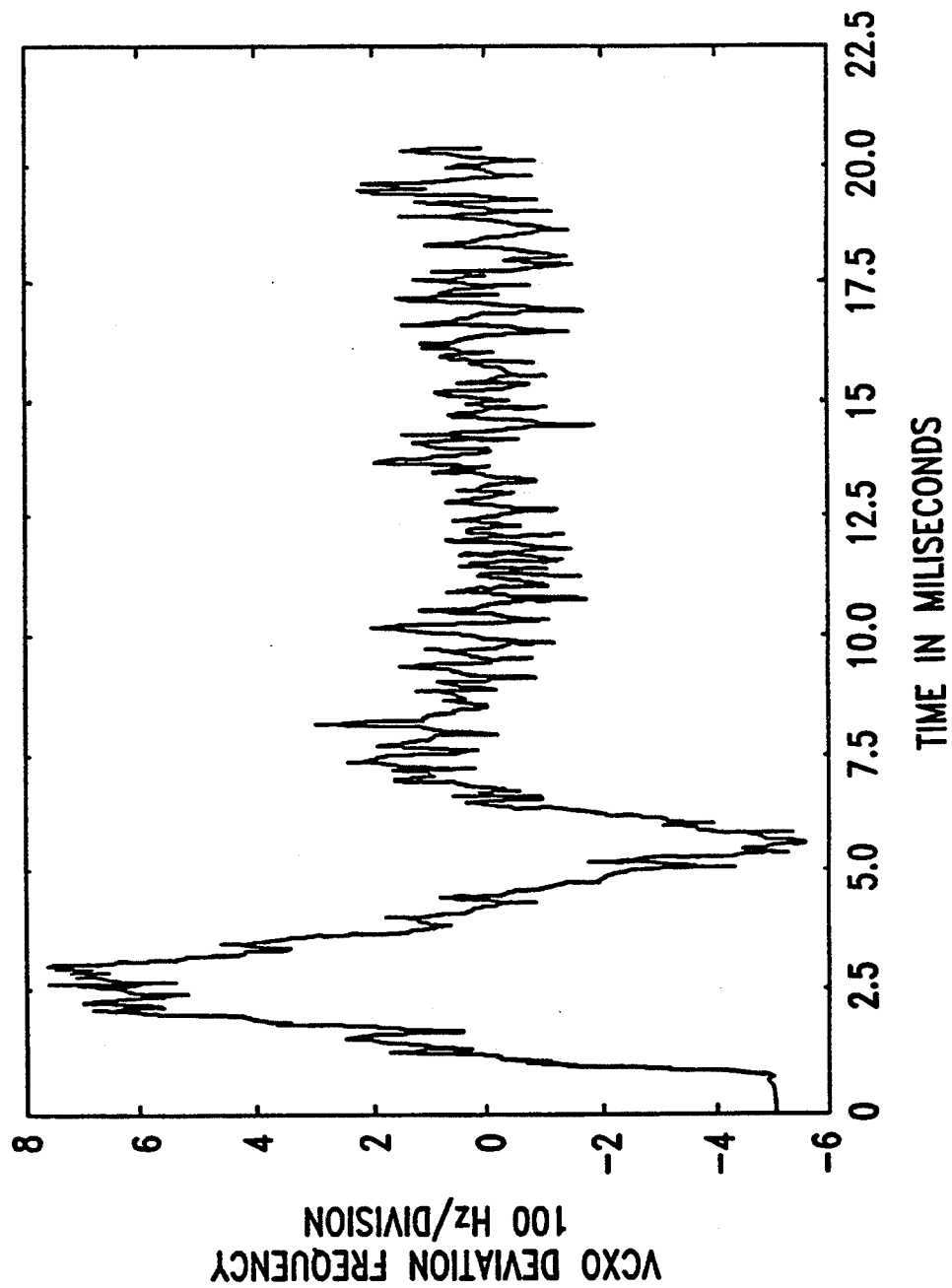

DIGITAL TIMING RECOVERY CIRCUIT

FIELD OF THE INVENTION

The present invention is directed to digital timing recovery circuits and, more particularly, to an implementation efficient digital symbol timing recovery circuit that can be implemented without the use of multipliers.

BACKGROUND OF THE INVENTION

Various transmission services, e.g., high definition television ("HDTV") services, currently use or are expected to use a Quadrature Amplitude Modulated ("QAM") signal for the transmission of data. The data transmitted by such services, in the form of a QAM analog transmission signal, represents a bitstream comprising a series of symbols, each symbol comprising a number of bits.

To recover the data from a QAM or other signal comprising a series of symbols, a receiver is required to convert the analog signal received into a digital signal and to distinguish between the individual symbols which comprise the signal bitstream. Symbol timing recovery is used to recover a clock signal at the symbol rate, or a multiple of the symbol rate, from the modulated waveform that is received. This clock signal may then be used by the receiver to convert the continuous-time received signal into a discrete-time sequence of data symbols.

QAM demodulators usually rely on symbol timing recovery before any other form of synchronization. Symbol timing, also known as symbol synchronization or bit synchronization, is required for correct sampling of a received QAM analog waveform to minimize inter-symbol interference ("ISI") distortion and to establish a baseline for symbol timing.

Numerous techniques presently exist for symbol timing recovery, such as spectral line extraction and use of least mean square ("LMS") timing circuits. Currently, the spectral line extraction technique is the most popular method of symbol timing recovery and is frequently implemented using analog circuits.

Known timing recovery circuits commonly use analog timing recovery techniques. Such timing recovery circuits may pass a received QAM signal through diodes and then use the envelope of the QAM signal to extract bit timing information. Such known analog circuits have several disadvantages over digital timing recovery circuits. One disadvantage is that such analog circuits fail to make use of the digital matched filtering principle of Nyquist filters which is important when the transmitted signal has only small amounts of excess bandwidth for pulse shaping.

In the case of HDTV signals which may have only 10 percent excess bandwidth for pulse shaping, the resulting tone after a non-linear operation has a very low signal to noise ratio ("SNR"). In such a case, the SNR improvement which can be obtained using a matched Nyquist filter as opposed to an analog filter becomes important since it may result in less clock jitter in the timing signal which is recovered from the QAM signal than would be possible without the use of a matched Nyquist filter.

Known analog timing recovery circuits also have the disadvantage of requiring highly accurate analog phase lock loop circuits which can be difficult and costly to implement. Still another disadvantage of analog timing recovery circuits is that they are difficult and expensive to implement as part of a chip set.

The difficulty and relatively high cost of implementing analog timing recovery circuits is due in part to the sensitivity of component tolerance mismatching which makes it necessary to fine tune analog timing recovery circuits. Such fine tuning is often time consuming and thus adds greatly to the cost of an analog timing recovery circuit. Accordingly, analog symbol timing recovery circuits may be both costly and difficult to implement.

SUMMARY OF THE INVENTION

The present invention provides an implementation efficient digital timing recovery circuit that can be implemented without the use of multipliers. The timing recovery circuit of the present invention implements a symbol timing recovery technique that is based on spectral line extraction making it suitable for use, e.g., as a symbol timing recovery circuit in, e.g., various types of receivers including HDTV receivers.

In accordance with one exemplary embodiment of the present invention, a digital timing recovery circuit implemented in accordance with the present invention is incorporated into a receiver which comprises an antenna, a tuner, an analog to digital ("A/D") converter and a Nyquist filter in addition to the timing recovery circuit of the present invention. The output of the receiver's tuner is supplied to the A/D converter with the sampling frequency of the A/D converter being controlled by the symbol timing recovery circuit of the present invention. The output of the receiver's A/D converter is coupled to the input of the Nyquist filter which has an I signal output and a Q signal output.

In an exemplary embodiment, the symbol timing recovery circuit of the present invention comprises a non-linear operation circuit, a digital bandpass filter, a digital bi-quadratic filter, a cross-correlator, a digital phase lock loop ("DPLL") circuit, a digital to analog converter ("A/D") circuit, a signal generator, a zero crossing detector, and an oscillator, e.g., a voltage controlled crystal oscillator ("VCXO"). An input of the non-linear operation circuit of the timing recovery circuit is coupled to the output of the Nyquist filter to receive one or both of the I and Q output signals from the Nyquist filter and to perform a non-linear operation on the signal or signals received from the Nyquist filter to generate a bit tone timing signal.

The output of the non-linear operation circuit is supplied to the bandpass filter, e.g., a bandpass finite impulse response ("FIR") filter which removes the D.C. component from the bit tone timing signal. The output of the bandpass filter is supplied to the bi-quadratic IIR filter. The bi-quadratic filter has a passband located at Fs/4 and a phase shift of approximately zero at Fs/4 where Fs/4 is one fourth the sampling rate of the A/D converter.

The output of the bi-quadratic filter is cross-correlated with the output signal of the signal generator that generates a 1, 0, −1, 0, . . . repeating sequence at a frequency of Fs/4. The output of the cross-correlator is supplied to the input of the digital phase lock loop circuit which generates an average error signal that is used to control the frequency of the VCXO which generates the signal that controls the sampling frequency Fs.

The DPLL circuit will continue to adjust the sampling frequency by controlling the VCXO until the average of the error signal output by the cross-correlator is zero indicating that the 1, 0, −1, 0, ... sequence generated by the signal generator is phase locked with the pulse train generated by the A/D converter from the signal being received.

A symbol decision clock signal is generated by the zero crossing detector by monitoring the zero crossings of the 1, 0, −1, 0, ... sequence generated by the signal generator.

By selecting the center frequency of the bi-quadratic filter to be located at Fs/4 and the weights of the bandpass FIR and bi-quadratic filter to be powers of two, the timing recovery circuit of the present invention can be implemented without the use of multipliers and without the need for precise analog phase lock loops or other analog circuits.

Accordingly, the timing recovery circuit of the present invention is all digital, except for the VCXO and a D/A converter for converting the digital output of the DPLL circuit to an analog signal for controlling the VCXO. The digital nature of the timing recovery circuit of the present invention and the lack of the need to use multipliers to implement the circuit provides an inexpensive and easy to implement timing recovery circuit when compared to analog timing recovery circuits.

BRIEF DESCRIPTION OF THE DRAWINGS

FIG. 5 is an illustration of the frequency characteristics of the voltage controlled crystal oscillator control signal generated by the timing recovery circuit of the present invention illustrated in FIGS. 1 and 2.

DETAILED DESCRIPTION

Figure 1A:
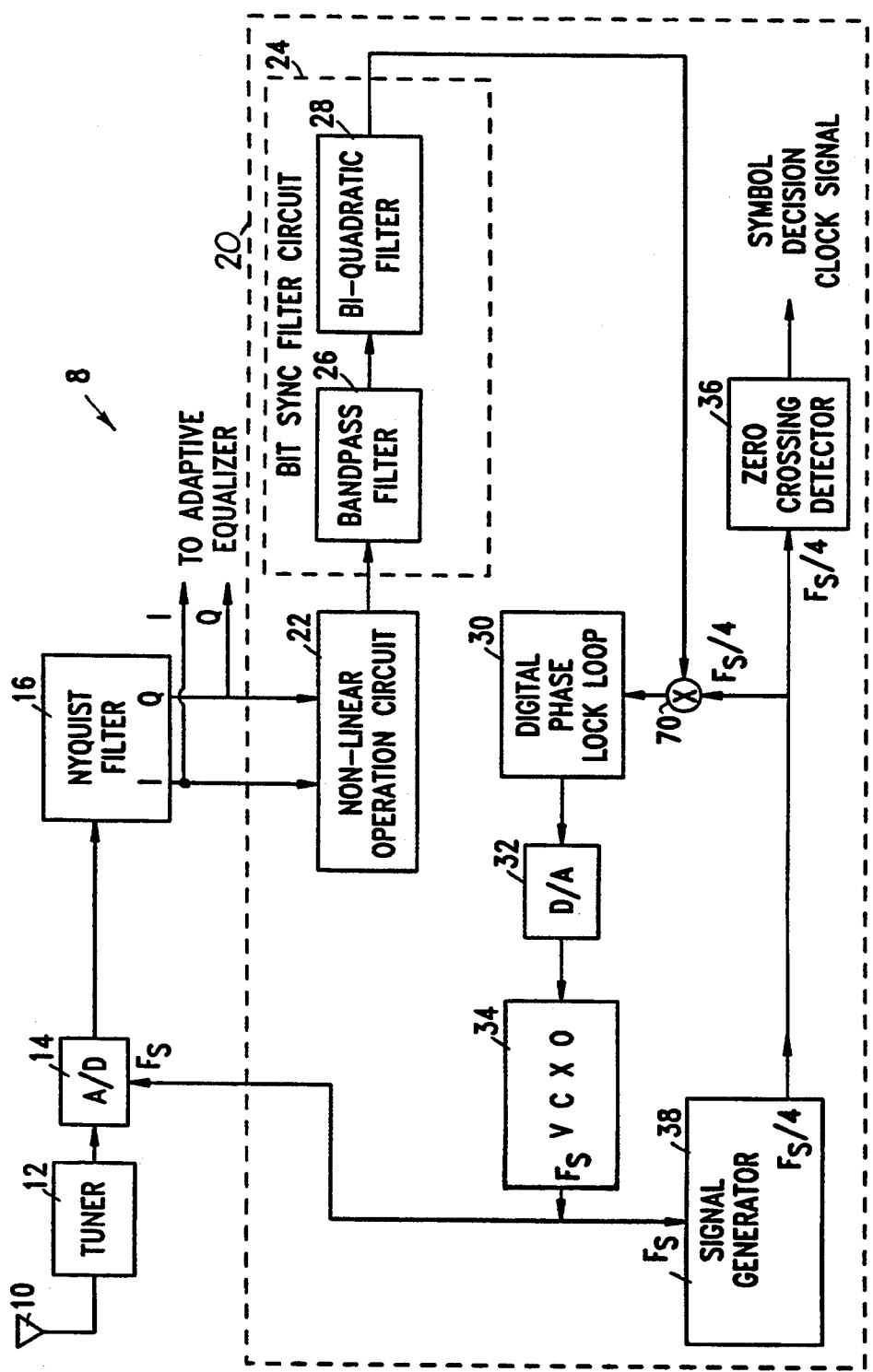
FIGS. 1A and 1B illustrates schematic block diagrams of a portion of a receiver incorporating a symbol timing recovery circuit implemented in accordance with embodiments of the present invention.

Referring now to the drawings, and initially to FIG. 1A, there is illustrated a receiver, e.g. a HDTV receiver, according to one embodiment of the present invention, generally indicated by the reference numeral 8. The receiver 8 comprises an antenna 10, a tuner 12, an A/D converter 14, a Nyquist filter 16 and a timing recovery circuit 20 which is implemented in accordance with one embodiment of the present invention.

The output of the antenna 10 is coupled to the input of the tuner 12, which, in turn, has an output coupled to an input of the A/D converter 14. In this manner, a signal, e.g., a QAM HDTV signal, received by the antenna 10 and tuner 12 is supplied to the input of the A/D converter 14. A sampling frequency control signal output of the timing recovery circuit 20 is coupled to a sampling frequency control signal input of the A/D converter 14.

The A/D converter 14 samples the QAM signal output by the tuner 12 at a frequency determined by the frequency Fs of a sampling frequency control signal output by the timing recovery circuit 20. An output of the A/D converter 14 is coupled to the input of the Nyquist filter 16. The Nyquist filter 16 receives the digital signal output by the A/D converter 14 and generates an in-phase ("I") signal and a quadrature-phase ("Q") signal from the received signal. The I and Q signals are output by the Nyquist filter 16 via I and Q signal outputs which are coupled to corresponding I and Q signal inputs of the timing recovery circuit 20 and may also be coupled to, e.g., the input of an adaptive equalizer for further signal processing.

The timing recovery circuit 20 illustrated in FIG. 1, comprises a non-linear operation circuit 22, a bit synchronization ("sync") filter circuit 24, a cross-correlator 70, a DPLL circuit 30, a D/A converter 32, a VCXO 34, a signal generator 38 and a zero crossing detector 36. The bit sync filter circuit 24 comprises a bandpass FIR filter 26 and a bi-quadratic IIR filter 28. The timing recovery circuit 20 implements a spectral line extraction technique that is performed entirely in the digital domain except for the use of the VCXO 34, A/D converter 14 and a D/A converter 32. Thus, the timing recovery circuit 20 of the present invention does not require fine tuned analog circuits which may add significantly to the cost of a timing recovery circuit.

The I and Q signal outputs of the Nyquist filter 16 are coupled to corresponding I and Q signal inputs of the non-linear operation circuit 22. The non-linear operation circuit 22 receives the I and Q signals output by the Nyquist filter 16 and performs a non-linear operation on each of the signals which are then summed to produce a bit tone timing signal. The output of the non-linear operation circuit 22 is coupled to the input of the bandpass FIR filter 26 which in turn has its output coupled to the input of the bi-quadratic IIR filter 28. The output of the bi-quadratic IIR filter 28 is coupled, via the output of the bit sync filter circuit 24, to a first input of the cross-correlator 70. A second input of the cross-correlator 70 is coupled to an internal clock signal output of the signal generator 38.

The signal generator 38 generates an internal clock signal having a frequency of Fs/4 which it outputs via its internal clock signal output.

The internal clock signal output of the signal generator 38 is coupled to an input of the zero crossing detector 36. The zero crossing detector 36 generates a symbol decision clock signal that is supplied to the adaptive equalizer and to other timing circuits of the receiver 8.

The cross-correlator 70 has an output coupled to an input of the DPLL circuit 30. The DPLL circuit 30, in turn, has an output coupled to the input of the D/A converter 32. The DPLL circuit 30 generates a digital VCXO control signal which is converted into an analog signal by the D/A converter 32. An analog VCXO control signal output of the D/A converter is coupled to a corresponding input of the VCXO 34.

The VCXO 34 has a sampling frequency control signal output coupled to an input of the signal generator 38 and to a sampling frequency control input of the A/D converter 14. In response to the analog VCXO control signal the VCXO 34 generates a sampling frequency control signal, at the sampling frequency control signal output with a frequency Fs. This sampling frequency control signal is used to control the A/D converter 14 to sample the analog signal at a frequency of Fs.

Figure 1B:
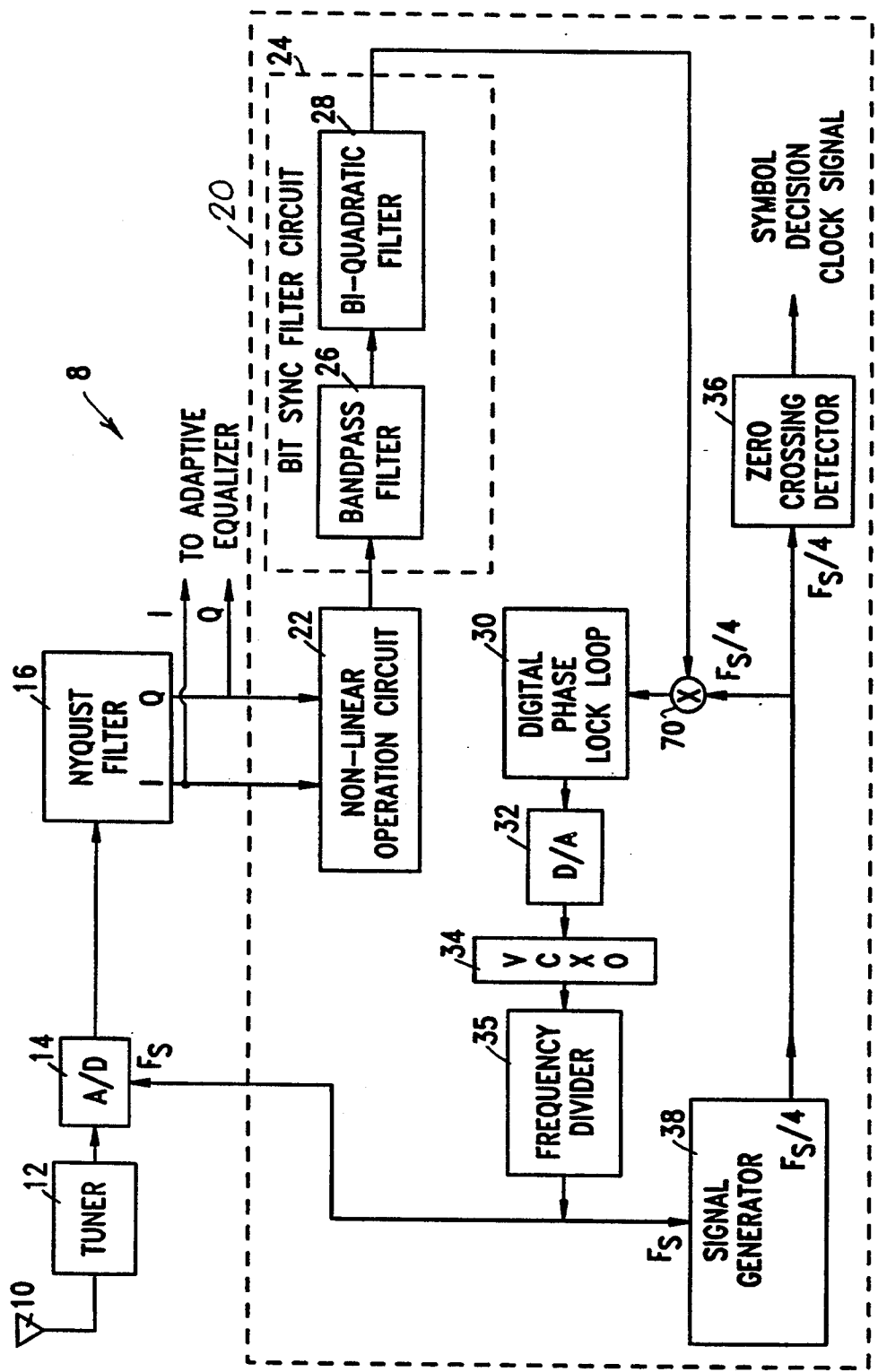
Figure 2:
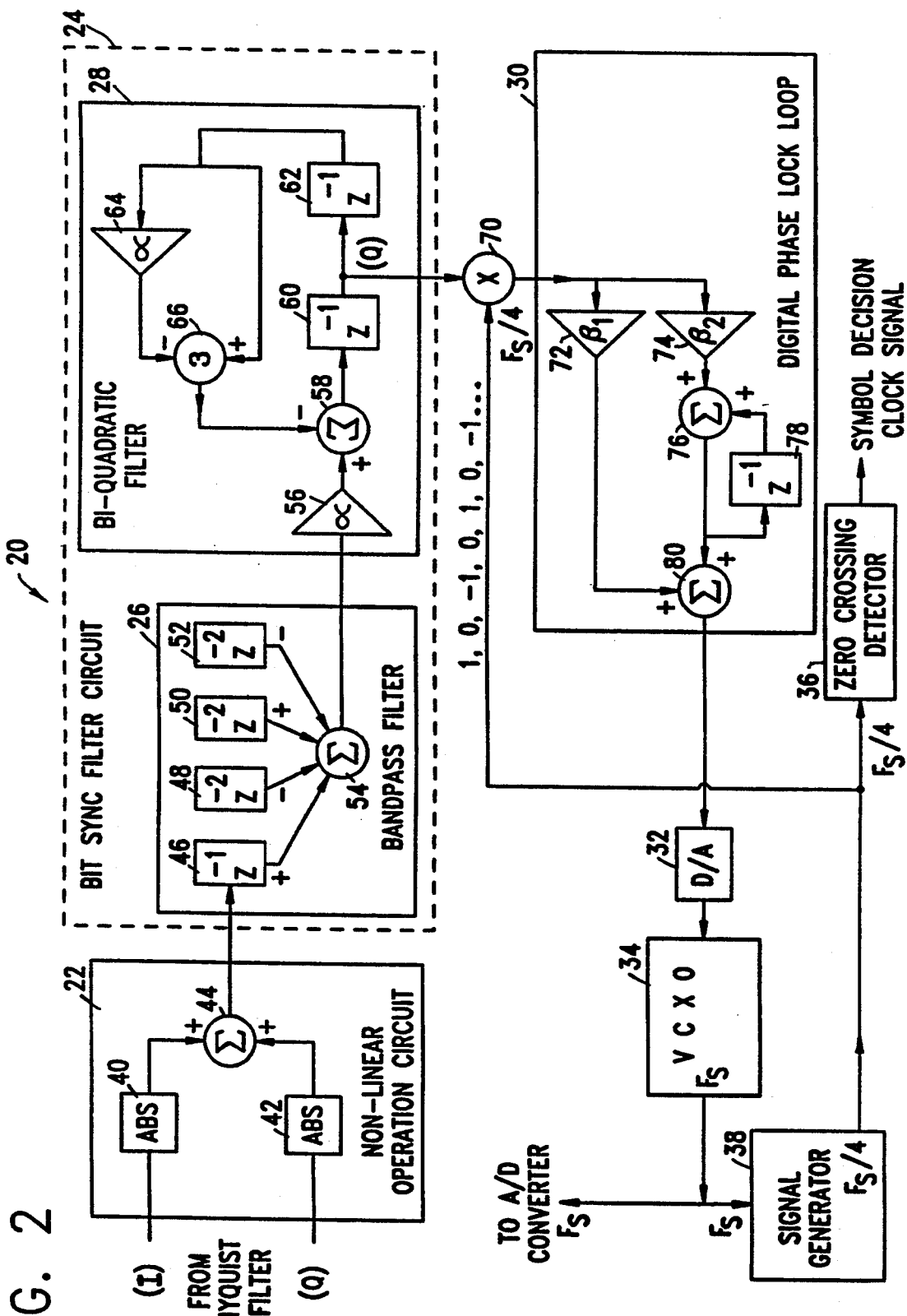
FIG. 2 illustrates a more detailed schematic block diagram of the symbol timing recovery circuit illustrated in FIG. 1.

While in the embodiment illustrated in FIGS. 1A and 2, the VCXO 34 is depicted as generating a sampling frequency control signal having a frequency of Fs, in another embodiment illustrated in FIG. 1B, VCXO 34 may generate a signal that is a multiple of Fs. In such a case, a frequency divider 35 may be coupled to the output of the VCXO 34 to generate the sampling frequency control signal which has a frequency of Fs. Thus, depending on the particular embodiment, the signal generator 38 may receive either the sampling frequency control signal or the signal directly output by the VCXO 34. From the received signal, the signal generator 38 generates the internal clock signal which has a frequency of Fs/4.

The operation of the timing recovery circuit of the present invention illustrated in FIG. 1A will now be described with reference to FIG. 2 which illustrates the timing recovery circuit 20 of FIG. 1A in greater detail.

Generally, operation of the receiver 8 requires a timing recovery circuit to derive bit timing information from a received QAM signal or other signal that comprises a series of symbols. The timing recovery circuit 20 of the present invention uses a non-linear signal processing method to generate the required bit timing information and to compensate for frequency inaccuracies in the VCXO which would otherwise result in the VCXO generating a sampling frequency control signal with a frequency Fs, that differed from the desired sampling rate of four times the symbol rate of the signal being received.

In the embodiment illustrated in FIG. 2, the non-linear operation circuit 22 comprises a first absolute value circuit 40, a second absolute value circuit 42 and an adder 44. The first absolute value circuit 40 has an input coupled to the I signal output of the Nyquist filter 16 while the second absolute value circuit 42 has an input coupled to the Q signal output of the Nyquist filter 16. The outputs of the first and second absolute value circuits 40, 42 are coupled to corresponding first and second inputs of the adder 44. The output of the adder 44 is, in turn, coupled to the input of the bandpass FIR filter 26 of the bit sync filter circuit 24.

The I and Q signals from the Nyquist filter 16 are passed through the absolute value circuits 40, 42 and summed by the adder 44 to form a bit tone timing signal which is supplied to the bandpass FIR filter 26 of the bit sync filter circuit 24. Thus, the output of the adder 44 comprises a timing signal which has a SNR related to the SNR of the received signal and the excess bandwidth of the Nyquist filter 16.

While the embodiment of the non-linear operation circuit 22 illustrated in FIG. 2 includes absolute value circuits 40, 42 for performing a non-linear operation, the non-linear operation circuit 22 may be implemented using circuits which perform a variety of other non-linear operations, such as squaring, instead of the absolute value operation. In addition, the non-linear operation circuit can generate the bit tone timing signal from either the I or Q signal alone. Such an embodiment requires only a single absolute value circuit to implement the non-linear operation circuit. However, by using both the I and Q signals, a bit tone timing signal with a greater signal to noise ratio may be generated than would be possible using only an I or Q signal alone.

To extract the relatively small timing tones that may be present in the received signal, the timing signal output by the non-linear operation circuit 22 is supplied to the input of the bandpass FIR filter 26 which is designed to remove the direct current ("D.C.") component of the timing signal output by the non-linear operation circuit 22.

The bandpass FIR filter 26, illustrated in FIG. 2, is a seven tap FIR filter comprising a first-order unit delay element 46, first through third second-order unit delay elements 48, 50, 52 and an adder 54. The adder 54 comprises two summing inputs and two subtractor inputs.

The output of the non-linear operation circuit's adder 44 is coupled to the input of the first-order unit delay element 46. The first-order unit delay element 46 has a first output coupled to the input of the first second-order unit delay element 48 and a second output coupled to the first summing input of the adder 54. The first second-order unit delay element 48 has a first output coupled to the input of the second second-order unit delay element 50 and to a first subtractor input of the adder 54. The second second-order unit delay element 50 has a first output coupled to the input of the third second-order unit delay element 52 and a second output coupled to the second summing input of the adder 54. An output of the third second-order unit delay element 52 is coupled to the second subtractor input of the adder 54. The output of the adder 54 is coupled to the input of the bi-quadratic IIR filter 28.

While each of the unit delay elements 46, 48, 50 are illustrated as having two outputs, it is to be understood that the same output signal is available at the first and second outputs of each of the unit delay elements 46, 48, 50. Thus, two separate outputs are shown only for the purpose of illustration and are not required for implementation purposes.

The bandpass FIR filter 26, illustrated in FIG. 2, may be implemented using only sums and differences of the input signal avoiding the use of more costly multiplier elements.

Figure 3:
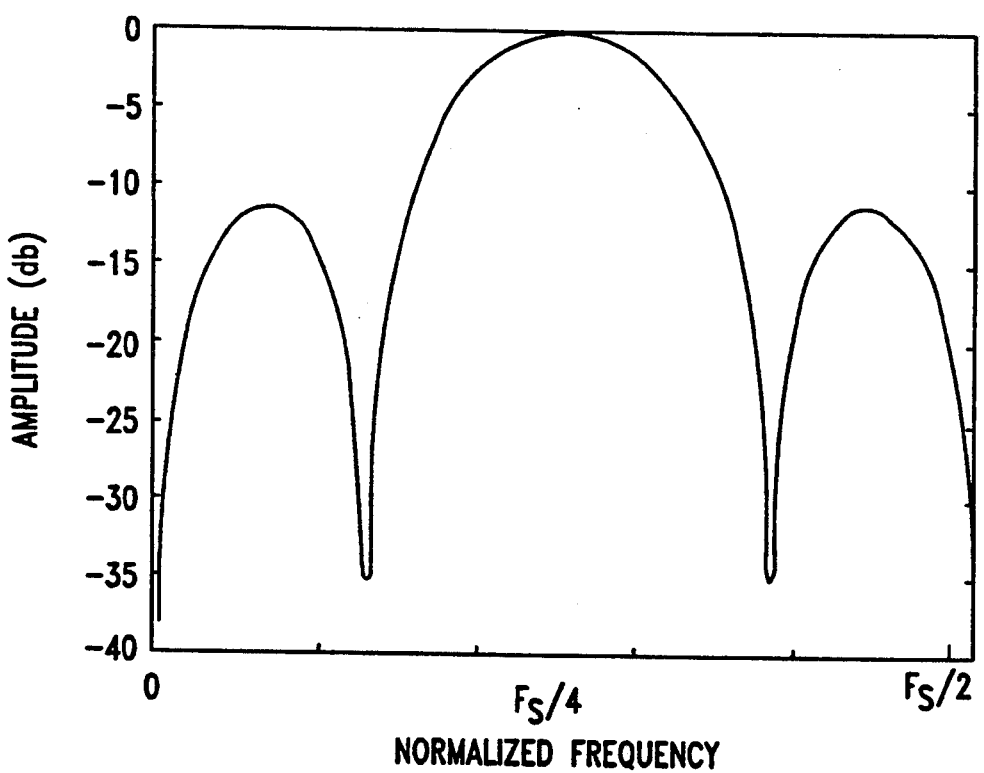
FIG. 3 is an illustration of the frequency response characteristics of the bandpass filter of the symbol timing recovery circuit illustrated in FIGS. 1 and 2.

The bandpass FIR filter 26 acts as a sliding window that is translated up to Fs/4, i.e., one fourth the sampling frequency, Fs, of the A/D converter 14. When the received signal is synchronized with the sampling frequency control signal, the sampling frequency Fs will be four times the symbol rate of the received signal. The spectral response of the bandpass FIR filter 26 is illustrated in FIG. 3. As illustrated the spectral response of the bandpass FIR filter 26 has a gain of zero at D.C., i.e., zero Hz. Such a D.C. gain is desirable because the absolute value of each of the I and Q signals, output by the Nyquist filter 16, contain a large D.C. bias. By using a bandpass FIR filter 26, with a gain of zero at D.C., the D.C. signal bias is removed from the timing signal output by the non-linear operation circuit 22. Thus, there is no need for the following bi-quadratic IIR filter 28 to have a large dynamic range, as there would be if such a D.C. bias were not eliminated. The bandpass FIR filter 26 serves as the first stage in increasing the SNR of the bit tone timing signal output by the non-linear operation circuit 22.

The second stage of increasing the SNR of the timing signal is the bi-quadratic IIR filter 28. The bi-quadratic IIR filter 28 comprises a first weight element 56 having a gain of $\alpha$, a first adder 58, a first unit delay element 60, a second unit delay element 62, a second weight element 64 having a gain of $\alpha$, and a second adder 66.

The input of the first weight element 56 is coupled to the filtered timing signal output of the bandpass FIR filter 26 so that the first weight element 56 receives the filtered timing signal from the bandpass FIR filter 26. The output of the first weight element 56 is coupled to a summing input of the adder 58. The adder 58 has an output coupled to the input of the first unit delay element 60 which, in turn, has an output coupled to the input of the second unit delay element 62 and to a first input of the cross-correlator 70. The output of the second unit delay element 62 is coupled to a summing input of second adder 66 and to the input of the second weight element 64. The output of the second weight element 64 is coupled to a subtracting input of the first adder 66.

The filtered timing signal output by the bandpass FIR filter 26 is received and further filtered by the bi-quadratic IIR filter 28 to generate a quadrature-phase reference signal ("Q reference signal").

Figure 4:
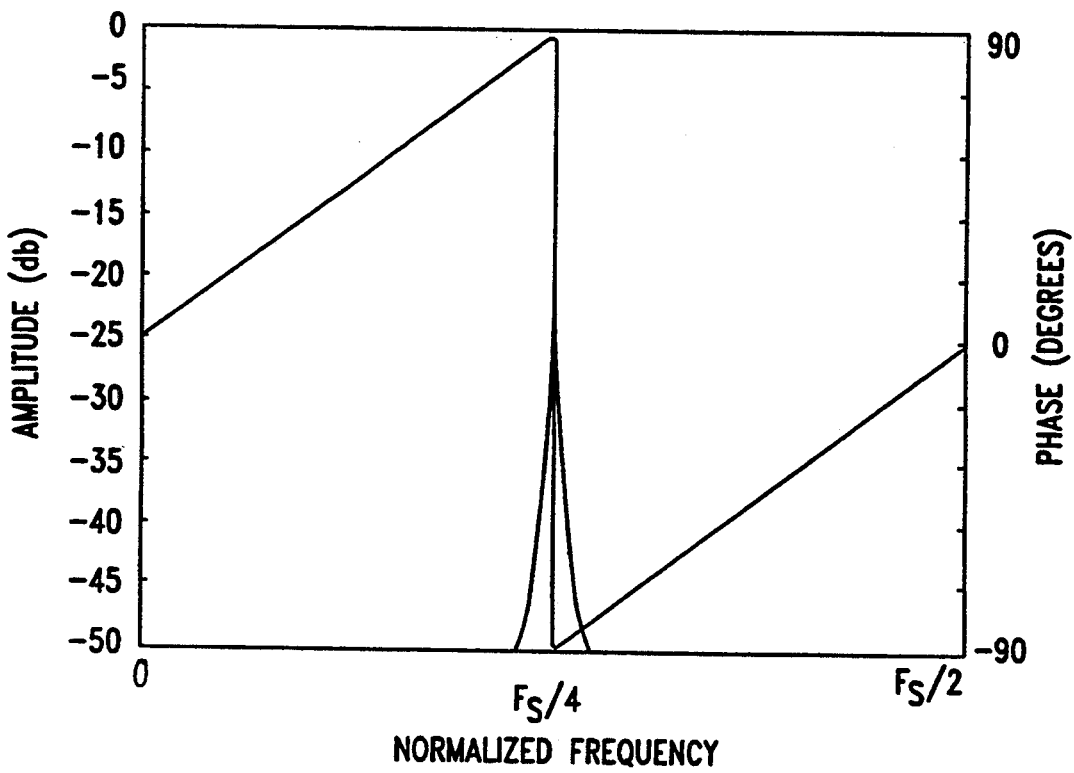
FIG. 4 is an illustration of the frequency and phase response of the bi-quadratic filter of the symbol timing recovery circuit illustrated in FIGS. 1 and 2.

Referring now to FIG. 4, the phase and amplitude response of the bi-quadratic IIR filter 28 is illustrated. As illustrated the bi-quadratic IIR filter 28 has a passband centered at Fs/4, where Fs is four times the symbol rate of the signal being received when the received signal is synchronized with the sampling frequency control signal which has a frequency of Fs. Furthermore, from FIG. 4 it can be seen that the bi-quadratic IIR filter 28 is a unity gain filter with a phase shift of zero at the frequency of Fs/4.

Thus, sampling the received analog signal by the A/D converter 14 at four times the symbol rate will place the bit tone at Fs/4, i.e., the center of the bi-quadratic IIR filter's passband. At Fs/4, the phase shift induced by the bi-quadratic IIR filter 28 on the filtered bit tone timing signal that was passed through the bandpass FIR filter 26 will be zero. However, if the sampling rate, Fs, which is controlled by the sampling frequency control signal output by the VXCO 34 differs from four times the symbol rate, the bit tone timing signal will not fall exactly at Fs/4 and some phase shift will be induced onto the bit tone timing signal. This resulting phase shift can be detected and used to generate a sampling frequency error signal by cross-correlating the Q reference signal output by the bi-quadratic IIR filter 28 with the internal clock signal that is generated by the signal generator 38 from the sampling frequency control signal.

The Z transform of the bi-quadratic IIR filter 28 is as follows:

$$\frac{Y(Z)}{X(Z)} = \frac{A_n + B_n Z^{-1}}{A_d + B_d Z^{-1} + Z^{-2}}$$

where, $A_n = \alpha/(1-\alpha)$, $B_n = -\alpha^* \cos(\omega(t))/(1-\alpha)$, $A_d = 1/(1-\alpha)$, and $B_d = -(2-\alpha)^* \cos(\omega(t))/(1-\alpha)$ and where $\alpha$ is a real number.

Selecting and using a center frequency of Fs/4 as the center frequency of the bi-quadratic IIR filter 28 permits the bi-quadratic filter 28 to be simple in design with all the center coefficients of the bi-quadratic IIR filter's transfer function becoming zero or unity as can be seen by inserting $(\pi/2)$ in the above equation for $\omega(t)$.

Accordingly, as illustrated in FIG. 2, the bi-quadratic IIR filter 28 may be implemented in a simple manner using only two delay registers to implement the two unit delay elements 60, 62, two multipliers 56, 64 to implement the two weight elements 56, 64, and two adders. Furthermore, because the two multipliers 56, 64 are selected to be powers of two, in this embodiment, they may be implemented as shift operations. Hence the entire bi-quadratic IIR filter 28 may be implemented using two shift registers, two delay registers, and two adders.

The bandwidth of the bi-quadratic IIR filter 28 is controlled by the size of alpha which is the gain of the two weight elements 56, 64 of the bi-quadratic filter circuit 28. A value for $\alpha$ that has been determined to work well for QAM signals with 10% excess bandwidth, e.g., QAM HDTV signals, is 0.000976563. This corresponds to a shift of 10 bits and results in a 3 dB bandwidth of 3 KHz using a sampling rate of 20 MHz.

When the inputs from the Nyquist filter 16 are 8 bits, which is likely in the case of QAM HDTV signals, the internal precision of the bi-quadratic IIR filter 28 should be at least 16 bits of accumulation.

The cross-correlator 70 receives the bi-quadratic IIR filter's Q reference signal via its first signal input. In addition, the cross-correlator 70 receives the internal clock signal via its second input. The cross-correlator 70 cross-correlates the received signals to generate a sampling frequency error signal which is supplied to the input of the DPLL circuit 30.

The capture range of the timing recovery circuit 20 is directly related to the bandwidth of the bi-quadratic IIR filter 28. A very small bandwidth increases the Q reference signal's SNR which will have the effect of reducing the phase jitter of the DPLL circuit 30. However, the drawback to a very small bandwidth is that it reduces the capture range of the DPLL circuit 30.

Because the capture range of the DPLL circuit 30 must be large enough to operate over the range of frequencies expected to be produced by the VCXO 34, the accuracy of the VCXO used will dictate how small the bandwidth of the bi-quadratic IIR filter 28 can be made. Accordingly, the more accurate the VCXO 34, the smaller the range of frequencies over which the DPLL circuit 30 must operate, thus permitting smaller bandwidths for the bi-quadratic IIR filter to be selected and used as compared to when the timing recovery circuit 20 is implemented with less accurate VCXOs.

When the sampling rate of the A/D converter 14 is 4 times the symbol rate, the bit tone timing signal will fall in the center of the bi-quadratic IIR filter's passband. In addition, the I output signal, which may be obtained from the output of the first summer 58 but which is not used in the embodiment illustrated in FIG. 2, will be in exact phase synchronization with the QAM pulse train and the Q reference signal will be in phase quadrature. The I output signal will be a A, 0, $-$A, 0, . . . repeating sequence, where A is some output amplitude. The Q reference signal will be the same waveform with a 90° phase shift, i.e., a one sample shift when the sampling frequency is four times the symbol rate.

When the Q reference signal output of the bi-quadratic IIR filter 28 is cross-correlated with the internal signal output by the signal generator 38 and the average error signal generated by the cross-correlation of the two signals is zero, the internal 1, 0, $-$1, 0, . . . sequence being produced by the signal generator 38 is phase locked with the pulse train that comprises the digitally converted signal being received.

The symbol decision clock signal is generated by the zero crossing detector 36 by examining the zero crossing transitions of the 1, 0, $-$1, 0, . . . sequence output by the signal generator 38. Thus, the zero crossing detector 36 generates a signal, i.e. the symbol decision clock signal having a frequency corresponding to the symbol rate of the received signal, with transitions corresponding to the detected zero crossing transitions of the Fs/4 signal output by the signal generator 38.

In the embodiment illustrated in FIG. 2, the DPLL circuit 30 is a second order digital phase lock loop circuit comprising a first and a second weight element 72, 74 having gains of $\beta 1$ and $\beta 2$, respectively, a first and a second adder 76, 80, and a unit delay element 78.

The input of the first and second weight elements 72, 74 are coupled to the output of the cross-correlator 70 and are thus supplied with the sampling frequency error signal generated by the cross-correlator 70. The output of the first weight element 72 is coupled to a summing input of the second adder 80.

The first adder 76 has a first summing input coupled to the output of the second weight element 74 and a second summing input coupled to the output of the first unit delay element 78. The output of the first adder 76 is coupled to a second summing input of the adder 80 and to the input of the first unit delay element 78. The output of the adder 80 is coupled to the input of the D/A converter 32.

The DPLL circuit 30 receives the sampling frequency error signal output by the cross-correlator 70 and generates an average frequency error signal. The average frequency error signal generated by the DPLL circuit 30 is used to control the VCXO 34 and thus to change the frequency of the sampling frequency control signal which determines the sampling frequency of the A/D converter 14. In this manner, the output of the DPLL circuit 30 is used to adjust the sampling frequency of the A/D converter 14 until the average error between the Q reference signal output by the bi-quadratic IIR filter 28 and the Fs/4 signal sequence of 1, 0, −1, 0, . . . output by the signal generator 38 is zero. As described above, if the sampling rate, Fs, which is determined by the sampling frequency control signal, is not synchronous with, and four times the symbol rate, the bit tone timing signal will fall either above or below the center frequency of the bi-quadratic IIR filter circuit 28 and the Q reference signal output by the bi-quadratic IIR filter 28 will no longer be a sinusoid with a frequency of Fs/4. This creates an error bias which the DPLL circuit 30 uses to generate the average error signal and to control the VCXO 34 and thus control the sampling frequency, Fs. A non-zero mean error signal will be generated by the DPLL circuit 30 until the bit tone timing signal generated from the received signal is centered at Fs/4, i.e., at the center of the bi-quadratic IIR filter's passband.

Because VCXOs frequently have a frequency offset from the true symbol rate, the timing recovery circuit 20 illustrated in FIG. 2 uses a second order DPLL circuit 30 which permits the introduction of a fixed bias to compensate for any frequency offset of the VCXO 34 from the true symbol rate. In one embodiment of the present invention, the gains $\beta 1$ and $\beta 2$ are selected to be powers of two so that the weight elements can be implemented using shift registers capable of performing shift right operations. Thus, no multipliers are required to implement the second order DPLL circuit 30, and the entire second order DPLL circuit 30 can be implemented using three shift registers and two adders.

The weights $\beta 1$ and $\beta 2$, which determine the gain of the DPLL circuit's first and second weight elements 72, 74, respectively, are selected according to the accuracy tolerance of the particular VCXO 34 used in the timing circuit 20 and to compensate for the frequency offset of the VCXO 34 from the desired sampling rate of four times the symbol rate of the received signal. To insure stability of the DPLL circuit 30, a pole/zero analysis may be performed to determine $\beta 1$ and $\beta 2$. However, a pole/zero analysis may be difficult to perform because the Nyquist filter 16 may introduce large delays. For example, a 64 tap Nyquist filter 16 produces a 64 coefficient polynomial which becomes part of the overall closed loop transfer function of the DPLL circuit 30. The roots of such an equation are difficult to find by mathematical analysis.

A more practical approach to determining the correct weights for $\beta 1$ and $\beta 2$ is to use experimentation. It has been determined through experimentation that when $\beta 2$ is about 1/10000 of $\beta 1$ the DPLL circuit 30 works well. Such an implementation of $\beta 2$ may be accomplished with a right shift of 13 bits.

While the average frequency control signal generated by the DPLL circuit 30 is in digital form, the VCXO 34 operates in response to an analog frequency control signal. Accordingly, the average frequency control signal output by the DPLL circuit 30 is supplied to the D/A converter 32 and converted into an analog frequency control signal which is then supplied to the VCXO 34. The D/A converter 32 may be a simple digital to analog converter device comprising, e.g., a combination of resistors and capacitors.

Referring now to FIG. 5, an example of the typical frequency deviation in the analog VCXO control signal output by the D/A converter 32 is illustrated. In the example illustrated in FIG. 5, the VCXO 34 was initially placed, in a simulation, 500 Hz below a desired sampling frequency of 20 Mhz, i.e. four times the 5 MHz symbol rate of proposed HDTV systems using QAM signals. The signal to noise of the QAM signal in the simulation was 16 db which corresponds to the lowest expected SNR for 32 bit QAM HDTV reception. As illustrated in FIG. 5, after only 10 milliseconds the frequency deviations in the analog VCXO control signal have essentially dropped to a zero mean indicating the phase lock for the DPLL circuit 30 has been achieved. Larger VCXO tolerances can be captured at the expense of longer phase lock times. The frequency deviations present in the VCX) control signal illustrated in FIG. 5 after the initial 10 millisecond period are primarily due to pattern noise.

In simulations, the capture range of the timing recovery circuit which served as the basis for the illustration in FIG. 5 has been found to be quite large with a 10 KHz capture range being easily achieved with the proper adjustment of the DPLL circuit's parameters $\beta 1$ and $\beta 2$.

It should be noted that VCXOs having frequency tolerances which will require a much smaller capture range than 10 KHZ are expected to be used in consumer HDTV receivers. Accordingly, the symbol timing recovery circuit of the present invention which uses all digital components except for the A/D converter 14, D/A converter 32 and VCXO 34 is expected to be well suited for use in HDTV receivers in addition to a host of other products where symbol timing recovery is necessary. Furthermore, the symbol timing recovery circuit of the present invention offers a primarily digital alternative which is simple and inexpensive to implement when compared to alternative analog symbol timing recovery circuits.

I claim:

1. A symbol timing recovery circuit, comprising:

an oscillator for generating a sampling frequency control signal, having a frequency of Fs, as a function of an average frequency error signal, the oscillator having an average frequency error signal input for receiving the average frequency error signal and an output for outputting the sampling frequency control signal;

an analog to digital converter for generating a digital signal from an analog signal, the analog to digital converter having an output for outputting the digital signal generated by the analog to digital converter, an analog signal input adapted for coupling to a tuner for receiving the analog signal from the tuner, and a sampling frequency control signal input coupled to the output of the oscillator for receiving the sampling frequency control signal and for controlling the rate at which the analog to digital converter samples the analog signal;

a Nyquist filter for filtering the digital signal to generate an in-phase signal, the Nyquist filter having an input coupled to the digital signal output of the analog to digital converter for receiving the digital signal, and a first output for outputting the in-phase signal;

a non-linear operation circuit for performing a non-linear operation on the in-phase signal to generate a timing signal, the non-linear operation circuit having a first input coupled to the first output of the Nyquist filter for receiving the in-phase signal, and an output for outputting the timing signal;

a digital bi-quadratic filter for filtering the timing signal to generate a quadrature-phase reference signal, the bi-quadratic filter having a passband centered at a frequency of Fs/4, wherein Fs/4 is a fraction of the frequency Fs, an input coupled to the output of the non-linear operation circuit for receiving the timing signal and an output for outputting the quadrature-phase reference signal;

a signal generator for generating, as a function of the sampling frequency control signal, an internal clock signal having the frequency of Fs/4, the signal generator having an input coupled to the output of the oscillator for receiving the sampling frequency control signal and an output for outputting the internal clock signal;

a cross-correlator for cross-correlating the internal clock signal and the quadrature-phase reference signal to generate a frequency error signal, the cross-correlator having a first input coupled to the output of the signal generator for receiving the internal clock signal and a second input coupled to the output of the bi-quadratic filter for receiving the quadrature-phase reference signal, and an output for outputting the frequency error signal; and a digital phase lock loop circuit for generating an average frequency error signal for adjusting the frequency of the sampling control signal generated by the oscillator, the digital phase lock loop circuit having an input coupled to the output of the cross-correlator and an output coupled to the input of the oscillator; and a means for generating a symbol decision clock signal from the internal clock signal coupled to the signal generator.

2. The symbol timing recovery circuit of claim 1, further comprising:

a digital bandpass filter having a gain of zero at 0 Hz for receiving and filtering the timing signal to attenuate the direct current component of the timing signal, the digital bandpass filter having an input coupled to the output of the non-linear operation circuit for receiving the timing signal and an output coupled to the input of the bi-quadratic filter for outputting the timing signal after filtering.

3. The symbol timing recovery circuit of claim 1, wherein the Nyquist filter further comprises a second output for outputting a quadrature-phase signal generated by the Nyquist filter; and wherein the non-linear operation circuit further comprises a second input coupled to the second output of the Nyquist filter for receiving the quadrature-phase signal, and a summer for summing a result of the non-linear operation performed on the in-phase signal and a result of a non-linear operation performed on the quadrature-phase signal to generate the timing signal.

4. The symbol timing recovery circuit of claim 2, wherein the non-linear operation circuit comprises:

a first absolute value circuit for performing an absolute value operation on the in-phase signal to generate a first absolute value signal, the first absolute value circuit having an input coupled to the in-phase signal output of the Nyquist filter and an output for outputting the first absolute value signal;

a second absolute value circuit for performing an absolute value operation on the quadrature-phase signal to generate a second absolute value signal, the second absolute value circuit having an input coupled to the quadrature-phase signal output of the Nyquist filter and a second absolute value signal output for outputting the second absolute value signal;

a first adder for adding the first and second absolute value signals, the adder having a first summing input coupled to the output of the first absolute value circuit, a second summing-input coupled to the output of the second absolute value circuit, and an output coupled to the output of the non-linear operation circuit.

5. The symbol timing recovery circuit of claim 4, wherein the digital bandpass filter comprises:

a seven tap bandpass finite impulse response (FIR) filter comprising, a second adder having a first and a second summing input and a first and a second subtracting input and an output coupled to the timing signal output of the bandpass FIR filter;

a first-order unit delay element comprising a shift register having an input coupled to the output of the non-linear operation circuit and an output coupled to the first summing input of the second adder;

a first second-order unit delay element comprising a shift register having an input coupled to the output of the first-order unit delay element and having an output coupled to the first subtracting input of the second adder;

a second second-order unit delay element comprising a shift register having an input coupled to the output of the first second-order unit delay element and an output coupled to the second summing input of the second adder; and a third second-order unit delay element comprising a shift register having an input coupled to the output of the second second-order unit delay element and an output coupled to the second subtracting input of the second adder.

6. The symbol timing recovery circuit of claim 2, wherein the digital bi-quadratic filter comprises a digital bi-quadratic infinite impulse response filter including:
an input coupled to the output of the bandpass filter;
a quadrature-phase reference signal output coupled to the second input of the cross-correlator; and
means for generating a quadrature-phase reference signal that, in the frequency domain, has the following relationship to the input signal:

$$\frac{Y(Z)}{X(Z)} = \frac{A_n + B_n Z^{-1}}{A_d + B_d Z^{-1} + Z^{-2}}$$

where, $A_n$=alpha/(1−alpha), $B_n$=−alpha*cos($\pi$/2)/(1−alpha), $A_d$=1/(1−alpha), and $B_d$=−(2−alpha)*cos($\pi$/2)/(1−alpha)

and where alpha is a real number.

7. The symbol timing recovery circuit of claim 2, wherein the means for generating a symbol decision clock signal comprises a zero crossing detector for generating a symbol decision clock signal in response to transitions in the internal clock signal.

8. The symbol timing recovery circuit of claim 2, wherein the oscillator comprises:
a voltage controlled crystal oscillator for generating an oscillator output signal having a frequency that is a multiple of Fs, the voltage controlled crystal oscillator having an input coupled to the output of the digital phase lock loop circuit and an output; and
a frequency divider for generating the sampling frequency control signal as a function of the oscillator output signal, the frequency divider having an input coupled to the output of the voltage controlled crystal oscillator and an output coupled to the sampling frequency control signal input of the analog to digital converter and to the input of the signal generator.

9. The symbol timing recovery circuit of claim 6, further comprising a digital to analog converter for converting the average frequency error signal output by the digital phase lock loop circuit, in digital form, into an analog average frequency error signal, the digital to analog converter having an input coupled to the output of the digital phase lock loop circuit for receiving the digital average frequency error signal and an output coupled to the input of the oscillator for outputting the analog average frequency error signal.

10. The symbol timing recovery circuit of claim 2, further comprising a digital to analog converter for converting the average frequency error signal output by the digital phase lock loop circuit in digital form, into an analog average frequency error signal, the digital to analog converter having an input coupled to the output of the digital phase lock loop circuit for receiving the digital average frequency error signal and an output coupled to the input of the oscillator for outputting the analog average frequency error signal.

11. The symbol timing recovery circuit of claim 2, wherein the digital phase lock loop circuit comprises a second order digital phase lock loop including
a first adder for summing a first and a second error signal to generate the average frequency error signal, the first adder having a first and a second summing input, and an output coupled to the output of the digital phase lock loop circuit for outputting the average frequency error signal;
a first weight element having a gain of $\beta 1$ for generating the first error signal, the first weight element comprising a shift register having an input coupled to the input of the digital phase lock loop circuit for receiving the frequency error signal, and an output, coupled to the first summing input of the first adder, for outputting the first error signal;
a second adder for generating the second error signal, the second adder having a first and a second summing input and an output, the output coupled to the second summing input of the first adder for outputting the second error signal;
a second weight element having a gain of B2, the second weight element having an input coupled to the input of the digital phase lock loop circuit for receiving the frequency error signal and an output coupled to the first summing input of the second adder; and
a first-order unit delay element for generating an error feedback signal having an input coupled to the output of the second adder and an output for outputting the error feedback signal coupled to the second summing input of the second adder.

12. A symbol timing recovery circuit, comprising:
an oscillator for generating a sampling frequency control signal with a frequency of Fs as a function of an average frequency error signal,
the oscillator having an average frequency error signal input for receiving the average frequency error signal and an output for outputting the sampling frequency control signal;
an analog to digital converter for generating a digital signal from an analog signal,
the analog to digital converter having an output for outputting the digital signal generated by the analog to digital converter, an analog signal input adapted for coupling to a tuner for receiving the analog signal from the tuner, and a sampling frequency control signal input coupled to the output of the oscillator for receiving the sampling frequency control signal and for controlling the rate at which the analog to digital converter samples the analog signal;
a Nyquist filter for filtering the digital signal to generate a quadrature-phase signal,
the Nyquist filter having an input coupled to the digital signal output of the analog to digital converter for receiving the digital signal, and a first output for outputting the quadrature-phase signal;
a non-linear operation circuit for performing a non-linear operation on the quadrature-phase signal to generate a timing signal,
the non-linear operation circuit having a first input coupled to the first output of the Nyquist filter for receiving the quadrature-phase signal, and an output for outputting the timing signal;

a digital bi-quadratic filter for filtering the timing signal to generate a quadrature-phase reference signal, the bi-quadratic filter having a passband located at a frequency Fs/4, wherein Fs/4 is a fraction of the frequency Fs, an input coupled to the output of the non-linear operation circuit for receiving the timing signal and an output for outputting the quadrature-phase reference signal;

a signal generator for generating, as a function of the sampling frequency control signal, an internal clock signal having the frequency of Fs/4, the signal generator having an input coupled to the output of the oscillator for receiving the sampling frequency control signal and an output for outputting the internal clock signal;

a cross-correlator for cross-correlating the internal clock signal and the quadrature-phase reference signal to generate a frequency error signal, the cross-correlator having a first input coupled to the output of the signal generator for receiving the internal clock signal and a second input coupled to the output of the bi-quadratic filter for receiving the quadrature-phase reference signal, and an output for outputting the frequency error signal; and a digital phase lock loop circuit for generating an average frequency error signal for adjusting the frequency of the sampling control signal generated by the oscillator, the digital phase lock loop circuit having an input coupled to the output of the cross-correlator and an output coupled to the input of the oscillator; and a means for generating a symbol decision clock signal from the internal clock signal coupled to the signal generator.

13. A receiver, comprising:

a tuner for receiving an analog signal, an oscillator for generating a sampling frequency control signal, having a frequency of Fs, as a function of an average frequency error signal, the oscillator having an average frequency error signal input for receiving the average frequency error signal and an output for outputting the sampling frequency control signal;

an analog to digital converter for generating a digital signal from the analog signal, the analog to digital converter having an output for outputting the digital signal generated by the analog to digital converter, an analog signal input coupled to a tuner for receiving the analog signal from the tuner, and a sampling frequency control signal input coupled to the output of the oscillator for receiving the sampling frequency control signal and for controlling the rate at which the analog to digital converter samples the analog signal;

a Nyquist filter for filtering the digital signal to generate an in-phase signal and a quadrature-phase signal, the Nyquist filter having an input coupled to the digital signal output of the analog to digital converter for receiving the digital signal, a first output for outputting the in-phase signal and a second output for outputting the quadrature-phase signal;

a non-linear operation circuit for performing a non-linear operation on each of the in-phase and quadrature-phase signals and for summing the result of the non-linear operations to generate a timing signal, the non-linear operation circuit having a first input coupled to the first output of the Nyquist filter for receiving the in-phase signal, a second input coupled to the second output of the Nyquist filter for receiving the quadrature-phase signal, and an output for outputting the timing signal;

a digital finite impulse response bandpass filter having a gain of zero at 0 Hz for receiving and filtering the timing signal to attenuate the direct current component of the timing signal, the digital finite impulse response bandpass filter having an input coupled to the output of the non-linear operation circuit for receiving the timing signal and an output for outputting the filtered timing signal a digital bi-quadratic infinite impulse filter for filtering the bandpass filtered timing signal to generate a quadrature-phase reference signal, the bi-quadratic infinite impulse-response filter having a passband located at a frequency of Fs/4, wherein Fs/4 is a fraction of the frequency Fs, an input coupled to the output of the bandpass filter for receiving the bandpass filtered timing signal and an output for outputting the quadrature-phase reference signal;

a signal generator for generating, as a function of the sampling frequency control signal, an internal clock signal having the frequency of Fs/4, the signal generator having an input coupled to the output of the oscillator for receiving the sampling frequency control signal and an output for outputting the internal clock signal;

a cross-correlator for cross-correlating the internal clock signal and the quadrature-phase reference timing signal to generate a frequency error signal, the cross-correlator having a first input coupled to the output of the signal generator for receiving the internal clock signal and a second input coupled to the output of the bi-quadratic filter for receiving the quadrature-phase reference signal, and an output for outputting the frequency error signal; and a second order digital phase lock loop circuit for generating an average frequency error signal for adjusting the frequency of the sampling control signal generated by the oscillator, the second order digital phase lock loop circuit having an input coupled to the output of the cross-correlator and an output coupled to the input of the oscillator;

a means for generating a symbol decision clock signal from the internal clock signal coupled to the signal generator.

14. A method of generating a symbol timing signal from an analog signal, the method comprising the steps of:

operating a tuner to receive and output the analog signal;

operating an oscillator in response to an average frequency error signal to generate a sampling frequency control signal having a frequency of Fs;

operating an analog to digital converter to receive the analog signal, to receive the sampling frequency control signal, and to generate a digital signal by sampling the analog signal at the frequency Fs;

filtering the digital signal to generate an in-phase signal and a quadrature-phase signal from the digital signal;

performing a non-linear operation on the in-phase signal to generate a first signal;

performing a non-linear operation on the quadrature-phase signal to generate a second signal;

summing the first and second signals to generate a bit tone timing signal;

filtering the bit tone timing signal using a bandpass finite impulse response filter with a gain of zero at zero Hz to attenuate the direct current component of the bit tone timing signal;

filtering the bit tone timing signal with the attenuated direct current component using a digital bi-quadratic passband filter having a passband located at Fs/4 to generate a quadrature-phase reference signal, Fs/4 is a fraction of Fs;

generating as a function of the sampling frequency control signal an internal clock signal with a frequency of Fs/4;

cross-correlating the internal clock signal and the quadrature-phase reference signal to generate a frequency error signal;

operating a second order digital phase lock loop circuit to generate an average frequency error signal from the frequency error signal to control the frequency of the oscillator;

detecting when the internal clock signal transitions to a value equal to zero; and generating a symbol decision clock signal as a function of the detected transitions in the internal clock signal.

15. The method of claim 14, wherein the step of performing the non-linear operation on the in-phase signal comprises the step of performing an absolute value operation on the in-phase signal; and wherein the step of performing the non-linear operation on the quadrature-phase signal comprises the step of performing an absolute value operation on the quadrature-phase signal.

* * * * *

UNITED STATES PATENT AND TRADEMARK OFFICE
CERTIFICATE OF CORRECTION

PATENT NO. : 5,388,127
DATED : February 7, 1995
INVENTOR(S) : Carl G. SCARPA

It is certified that error appears in the above-indentified patent and that said Letters Patent is hereby corrected as shown below:

Column 3, line 29, change "illustrates" to --illustrate--.

Column 13, line 29, change "alpha" at end of line to --alpha--.

Column 14, line 26, change "B2" to -- 2--.

Signed and Sealed this

Twenty-third Day of May, 1995

Attest:

BRUCE LEHMAN

*Attesting Officer*   *Commissioner of Patents and Trademarks*